United States Patent
Kajino (10) Patent No.: US 7,209,224 B2
(45) Date of Patent: Apr. 24, 2007

(54) LENS METER

(75) Inventor: Tadashi Kajino, Okazaki (JP)

(73) Assignee: Nidek Co., Ltd., Gamagori-shi (JP)

( * ) Notice: Subject to any disclaimer, the term of this patent is extended or adjusted under 35 U.S.C. 154(b) by 253 days.

(21) Appl. No.: 11/066,246

(22) Filed: Feb. 25, 2005

(65) Prior Publication Data

US 2005/0190360 A1   Sep. 1, 2005

(30) Foreign Application Priority Data

Feb. 27, 2004   (JP) ............................. 2004-055425

(51) Int. Cl.
  *G01B 9/00*   (2006.01)
(52) U.S. Cl. ..................................... 356/124
(58) Field of Classification Search ............... None
  See application file for complete search history.

(56) References Cited

U.S. PATENT DOCUMENTS

| | | |
|---|---|---|
| 3,880,525 A | 4/1975 | Johnson |
| 4,641,964 A | 2/1987 | Mitani et al. |
| 5,489,978 A | 2/1996 | Okumura et al. |
| 5,657,116 A | 8/1997 | Kohayakawa et al. |
| 5,719,668 A | 2/1998 | Orana et al. |
| 5,847,819 A | 12/1998 | Yanagi et al. |
| 5,917,586 A | 6/1999 | Ikezawa et al. |
| 6,061,123 A | 5/2000 | Ikezawa et al. |
| 2002/0131038 A1 | 9/2002 | Akaiyama et al. |
| 2002/0149745 A1 | 10/2002 | Fukama et al. |
| 2002/0154292 A1 | 10/2002 | Fukama et al. |
| 2003/0043367 A1 | 3/2003 | Kajino |

FOREIGN PATENT DOCUMENTS

| | | |
|---|---|---|
| EP | 0 686 841 A2 | 12/1995 |
| EP | 1 241 461 A2 | 9/2002 |
| JP | A 50-145249 | 11/1975 |
| JP | A 10-104118 | 4/1998 |
| JP | A 2003-075296 | 3/2003 |

*Primary Examiner*—Gregory J Toatley, Jr.
*Assistant Examiner*—Amanda Merlino
(74) *Attorney, Agent, or Firm*—Oliff & Berridge, pLC (57) ABSTRACT

A lens meter obtaining 0D-reference-coordinates of target-images not detected in a reference state and measuring even progressive lenses, has a lens rest, an optical system having an optical axis, a light source, measurement targets and a photo-sensor, a part calculating optical characteristics based on coordinates-change of target-images in a measurement state with the lens on the rest and axis from those in a reference state without the lens thereon, and an information memory. The part makes the memory store image-coordinates not detected in the reference state obtained during assembly/adjustment, and based on image-coordinates detected in the reference state after power application and before measurement and stored coordinates, obtains image-coordinates not detected in the reference state after power application and before measurement, and calculates characteristics based on coordinates-change of target-images detected in the measurement state from those detected in the reference state before measurement and obtained image-coordinates.

5 Claims, 5 Drawing Sheets

LENS METER

BACKGROUND OF THE INVENTION

1. Field of the Invention

The present invention relates to a lens meter for measuring optical characteristics of a lens for an eye such as a spectacle lens.

2. Description of Related Art

Conventionally, there is known a lens meter which places a lens on a measurement optical axis, projects a measurement light bundle onto the lens and measurement targets and photo-receives the measurement light bundle passed through the lens and the measurement targets by using a photo-sensor, and then obtains optical characteristics of the lens based on the photo-receiving results. This kind of lens meter previously obtains coordinates (positions) of images of the measurement targets detected by the photo-sensor in a reference state where the lens is not placed on the measurement optical axis (a lens-absent state), then obtains coordinates (positions) of images of the measurement targets detected by the photo-sensor in a measurement state where the lens is placed on the measurement optical axis (a lens-presented state), and calculates the optical characteristics of the lens based on a change in the coordinates in the measurement state with respect to the coordinates in the reference state.

Besides, in the conventional lens meter, the measurement targets are arranged limitedly within a range narrower than a photo-receiving surface of the photo-sensor. Therefore, when a portion which is not in the vicinity of an optical center of the lens such as an add section of a progressive lens or a bifocal lens is measured, there is a case where a part of the measurement target images is not detected due to generation of prism power (diopter), so that the measurement target images necessary for measurement come to short. Although there is a photo-sensor with a large photo-receiving surface, it is not easily available and is expensive.

When the measurement targets are arranged in a range wider than the photo-receiving surface of the photo-sensor in order to cope with the problems as above, some measurement target images are inevitably not detected in the reference state, and coordinates with so-called a "0D (diopter) reference" cannot be obtained for those measurement target images.

SUMMARY OF THE INVENTION

An object of the invention is to overcome the problems described above and to provide a lens meter capable of obtaining coordinates with a "0D reference" of even measurement target images not detected by a photo-sensor in a reference state where a lens is not placed on a measurement optical axis, and measuring even a progressive lens and the like easily and efficiently.

To achieve the objects and in accordance with the purpose of the present invention, a lens meter for measuring optical characteristics of a lens has a lens rest, having an opening, on which the lens is mounted, a measurement optical system having a measurement optical axis which passes through the opening, a light source which projects a measurement light bundle along the measurement optical axis, a plurality of measurement targets arranged on the measurement optical axis, and a photo-sensor which photo-receives the measurement light bundle passed through the opening and the measurement targets, a calculation part which calculates the optical characteristics of the lens based on a change in coordinates of images of the measurement targets in a measurement state where the lens is mounted on the rest and placed on the measurement optical axis with respect to coordinates of images of the measurement targets in a reference state where the lens is not mounted on the rest and not placed on the measurement optical axis, and a memory which stores information including the coordinates of the images of the measurement targets, wherein the calculation part makes the memory to store coordinates of images of the measurement targets not detected by the photo-sensor in the reference state which are obtained at the time of assembly and adjustment of the lens meter, and based on coordinates of images of the measurement targets detected by the photo-sensor in the reference state after power application to the lens meter and before measurement of the lens and the coordinates of the images of the measurement targets stored in the memory, obtains coordinates of images of the measurement targets not detected by the photo-sensor in the reference state after the power application to the lens meter and before the measurement of the lens, and calculates the optical characteristics of the lens based on a change in coordinates of images of the measurement targets detected by the photo-sensor in the measurement state with respect to the coordinates of the images of the measurement targets detected by the photo-sensor in the reference state before the measurement of the lens and the obtained coordinates of the images of the measurement targets not detected by the photo-sensor in the reference state before the measurement of the lens.

Additional objects and advantages of the invention are set forth in the description which follows, are obvious from the description, or may be learned by practicing the invention. The objects and advantages of the invention may be realized and attained by the lens meter in the claims.

BRIEF DESCRIPTION OF THE DRAWINGS

The accompanying drawings, which are incorporated in and constitute a part of this specification, illustrate embodiments of the present invention and, together with the description, serve to explain the objects, advantages and principles of the invention. In the drawings.

DETAILED DESCRIPTION OF THE PREFERRED EMBODIMENTS

Figure 1:
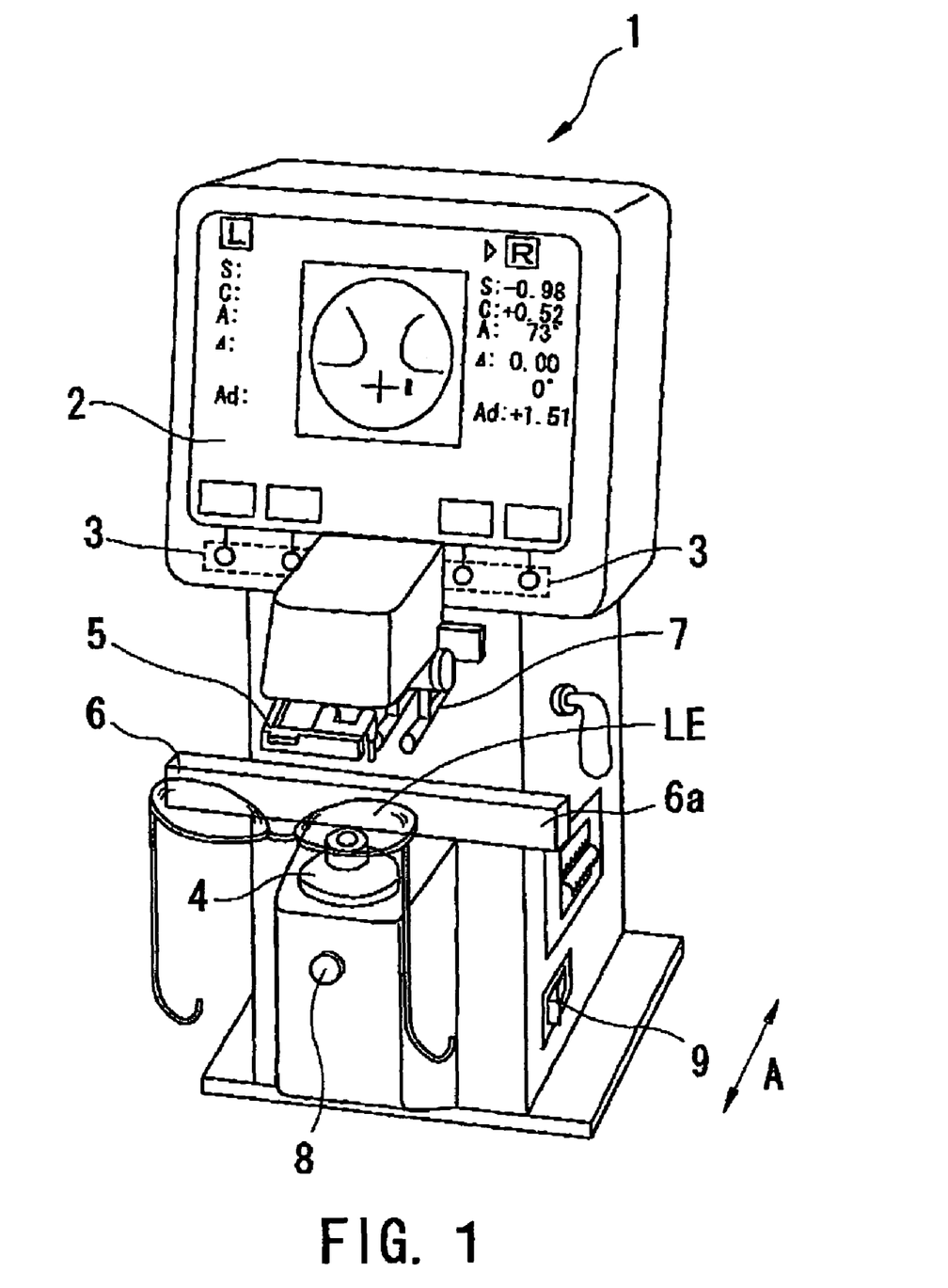
FIG. 1 is a view showing a schematic external view of a lens meter consistent with the preferred embodiment of the present invention.

A detailed description of one preferred embodiment of a lens meter embodied by the present invention is provided below with reference to the accompanying drawings. FIG. 1 is a view showing a schematic external view of a lens meter consistent with the preferred embodiment of the present invention.

On a display 2 such as a liquid crystal display arranged on the top of a body 1 of the lens meter, information necessary for measurement such as a mark for alignment, measurement results, and the like are displayed. Further, at the press of one of switches 3 corresponding to switch displays on the display 2, necessary instructions such as measurement mode switching are inputted.

A lens LE to be measured is mounted on a nosepiece (lens rest) 4, and a lens holder 5 is moved downward (to a nosepiece 4 side) to stably hold the lens LE mounted on the nosepiece 4.

When measuring the lens LE in frames, a frame table (lens table) 6 is brought into contact with the lower ends of right/left lens frames (or right/left lenses) for stabilization, so that a cylindrical (astigmatic) axial angle of the lens LE may be accurately measured.

A marking mechanism 7 is used for providing a mark on the lens LE. A READ switch 8 is for transmitting an instruction signal for storing the measurement results on the lens LE. At the press of the switch 8, the measurement results are displayed on the display 2 and concurrently stored into a memory inside the apparatus (lens meter). A power switch 9 is for applying power to the apparatus (lens meter).

Figure 2:
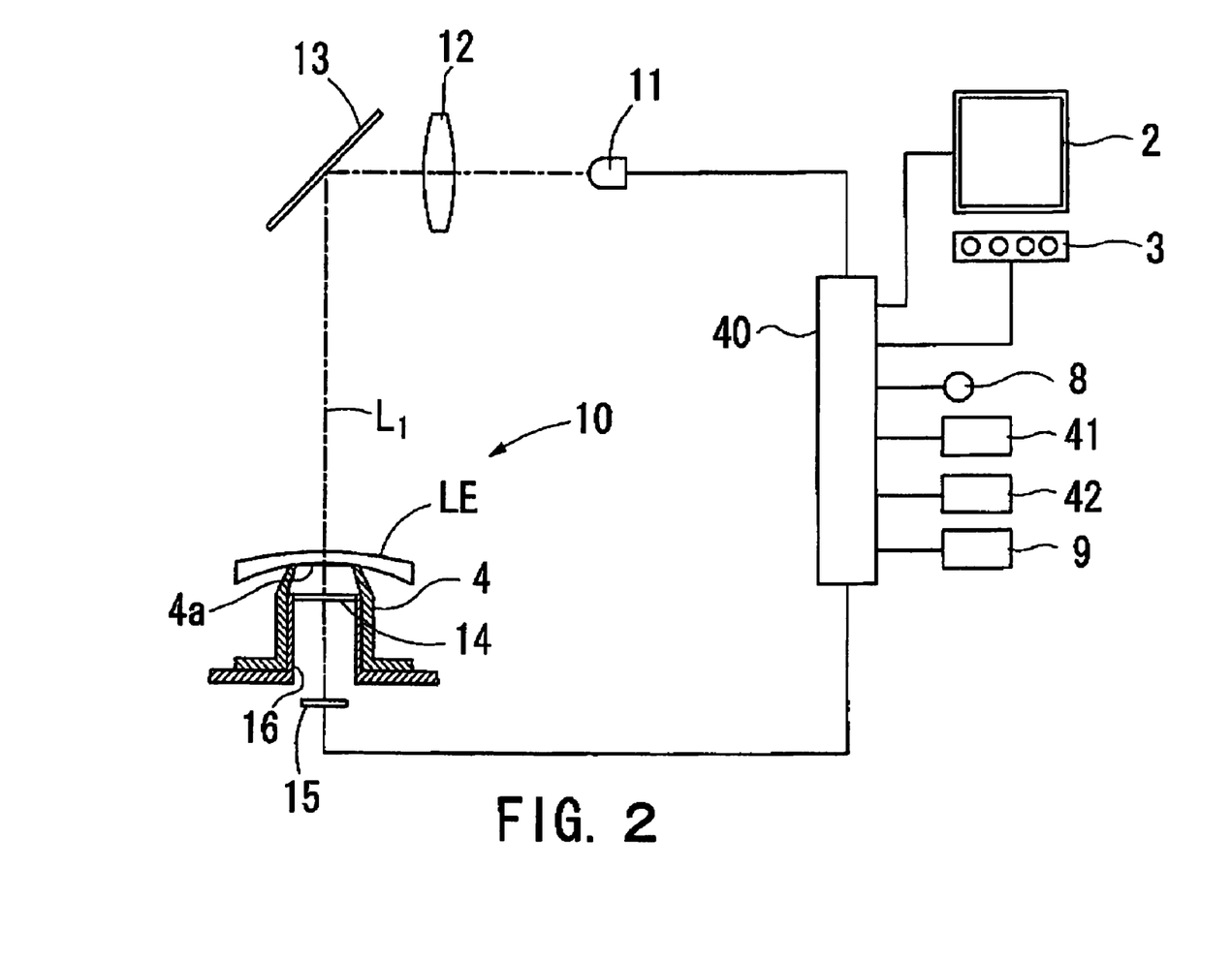
FIG. 2 is a view showing a schematic configuration of an optical system and a control system of the lens meter.

FIG. 2 is a view showing a schematic configuration of an optical system and a control system of the apparatus (lens meter) consistent with the present embodiment. Reference numeral 10 denotes a measurement optical system and L1 denotes a measurement optical axis thereof. The measurement optical system 10 is provided with a measurement light source 11 such as an LED, a collimating lens 12, a reflection mirror 13, a measurement target plate 14 on which measurement targets are formed, and a two-dimensional photo-sensor (image sensor) 15, which are arranged on the optical axis L1. The target plate 14 is held by a holding member 16 of the body 1, and an opening (aperture) 4a in the nosepiece 4 is placed above the target plate 14. The opening 4a is in a circular shape of 8 mm in diameter.

Figure 3:
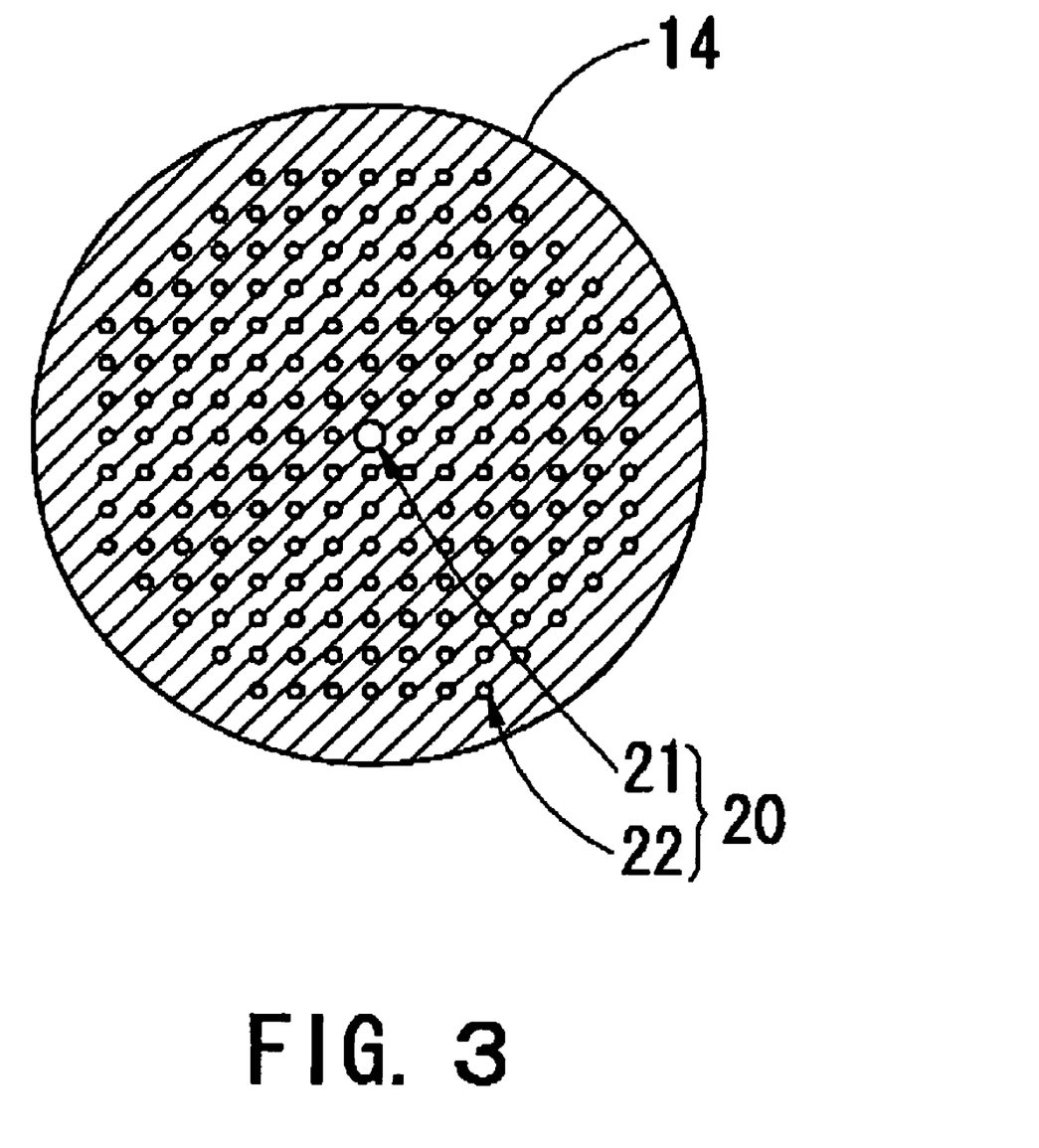
FIG. 3 is a view illustrating a pattern of arrangement (distribution) of measurement targets formed on a measurement target plate.

FIG. 3 is a view illustrating a pattern of arrangement (distribution) of the measurement targets formed on the measurement target plate 14. The target plate 14 is in a circular shape having a diameter slightly larger than an internal diameter of the opening 4a, and a number of measurement targets 20 are formed thereon. The measurement targets 20 consistent with the present embodiment include a large circular opening (aperture) of 0.4 mm in diameter being a central target 21 arranged in a center position through which the optical axis L1 passes, and small circular openings (apertures) of 0.2 mm in diameter being peripheral targets 22 arranged around the central target 21 with 0.5 mm pitches on a grid. The targets 22 of about 200 in number are arranged in a range of about 7 mm in diameter which is wider than a range corresponding to a photo-receiving surface (an effective image) of the photo-sensor 15. As an example of the photo-sensor 15, the one being 6 by 4.8 mm in size which is easily available to the public and inexpensive is used. The targets 22 arranged outside the range corresponding to the photo-receiving surface of the photo-sensor 15 are arranged such that, when the lens LE is mounted on the nosepiece 4 and placed on the optical axis L1 and prism power is generated, images of the targets 22 are detected by the photo-sensor 15. Besides, the targets 20 may be formed by providing black Cr coating with voids as the target 21 and the targets 22 on a rear surface of the target plate 14.

A measurement light bundle from the light source 11 is made a parallel light bundle by the collimating lens 12 and reflected by the mirror 13 to be projected onto the lens LE mounted on the nosepiece 4 and placed on the optical axis L1. In the measurement light bundle transmitted through the lens LE, a light bundle transmitted through the opening 4a, and then through the target (opening) 21 and the targets (openings) 22 on the target plate 14 enters the photo-sensor 15.

Incidentally, a distance from the opening 4a to the target plate 14 and a distance from the target plate 14 to the photo-sensor 15 are designed so that an image of the target 21 is detected by the photo-sensor 15 at all times even when a lens with negative spherical power (e.g., a lens with spherical power of −25D) assumed to be measurable or a prism (e.g., a prism with prism power of 10Δ) is mounted on the nosepiece 4 and placed on the optical L1. The image of the target 21 is utilized as an image of a reference target for specifying a correspondence among the images of the targets 22. Besides, it is essential only that the reference target is distinguishable from the other measurement targets, and it may be arranged in a position other than the central position of the target plate 14, and the number and shape thereof are not limited.

An output signal from the photo-sensor 15 is inputted to a calculation and control part 40. The calculation and control part 40 is connected with a non-volatile memory 41 and a memory 42. The calculation and control part 40 obtains optical characteristics of the lens LE (spherical power S, cylindrical (astigmatic) power C, a cylindrical (astigmatic) axial angle A, prism power Δ) from a change in respective coordinates of the target images detected by the photo-sensor 15 in a measurement state where the lens LE having refractive power is mounted on the nosepiece 4 and placed on the optical axis L1, with respect to respective coordinates of the target images detected by the photo-sensor 15 in a reference state where the lens LE is not mounted on the nosepiece 4 and not placed on the optical L1. For example, in a state where the lens LE having only the spherical power is placed on the optical axis L1, relative to the state where the lens LE is not placed on the optical axis L1, the coordinates of the target images are magnified or reduced in a perfect-circular shape with respect to an optical center of the lens LE. The spherical power S is obtained based on a magnification amount or a reduction amount at that time. Also, in a state where the lens LE having only the cylindrical power is placed on the optical axis L1, relative to the state where the lens LE is not placed thereon, the coordinates of the target images are magnified or reduced in an oval shape with respect to an axial center of the lens LE. The cylindrical power C and the cylindrical axial angle A are obtained based on a magnification amount or a reduction amount, and the like at that time. Further, the prism power Δ is obtained based on a translation amount of the coordinates of the image of the target 21 or the respective coordinates of the images of the targets 22 in the vicinity thereof. The lens LE having spherical power, cylindrical power, prism power and the like may be regarded as the complex of the above lenses (see U.S. Pat. No. 3,880,525 corresponding to Japanese Patent Application Unexamined Publication No. Sho50-145249).

Incidentally, the calculation and control unit 40 can obtain the optical characteristics of the lens LE from an average of the change in the coordinates of the target images in each group while making four (2×2 spots) (at least three) adjacent target images one group, or adjacent target images of 3×3 spots, 4×4 spots, 5×5 spots, or the like one group. A measurement position (measurement point) at this time is determined as a central position of each group of the target images or a position of a specific target image. In a case where the target images of 3×3 or more are made one group, even a part of the measurement targets are not detectable due to dusts adhered to the lens LE and the like, if the other target images in the group are detectable, the optical characteristics at the measurement position of the group may be obtained. Therefore, according to a constitution of the measurement targets of the apparatus consistent with the present embodiment, the optical characteristics at a plurality of measurement positions within the opening 4a may be calculated at a time. In other words, distribution of the optical characteristics within the opening 4a may be obtained. Thus, in a progressive lens, it is possible efficiently to judge whether or not the current measurement position is in a far viewing section (i.e., whether or not the far viewing section falls within a measurement area). Similarly, it is possible efficiently to judge whether or not the current measurement position is in a near viewing section (i.e., whether or not the near viewing section is within the measurement area).

Further, in the above-mentioned optical constitution, the target plate 14 may be arranged on a light source 11 side of the lens LE mounted on the nosepiece 4.

Hereinafter, in the above-mentioned constitution having the targets 21 and 22 arranged in a range wider than a range corresponding to the photo-receiving surface of the photo-sensor 15, a method of obtaining the coordinates of the target images with a "0D reference" will be described.

Figure 4A:
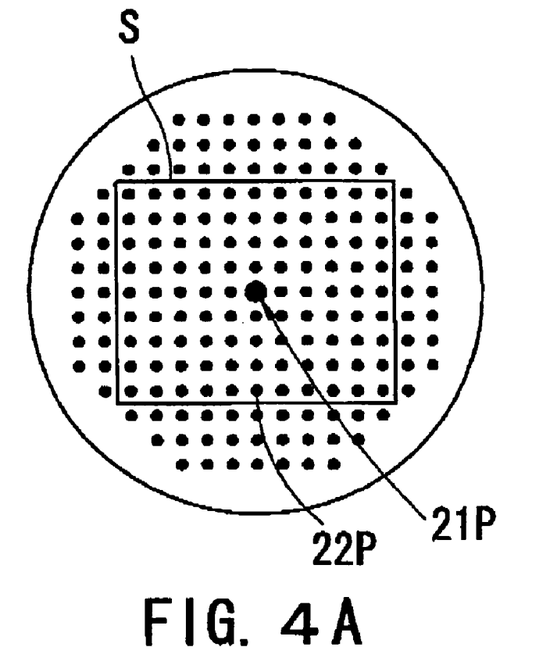
FIGS. 4A and 4B are views illustrating coordinates (positions) of measurement target images detected on a photo-receiving surface of a photo-sensor at the time of assembly and adjustment.

First, at the time of assembly and adjustment of the apparatus (lens meter), the respective coordinates of the target images detected by the photo-sensor 15 in the reference state where the lens LE is not mounted on the nosepiece 4 and not placed on the optical axis L1 are obtained. FIG. 4A is a view illustrating the coordinates of the target images detected on the photo-receiving surface of the photo-sensor 15 in the reference state. In FIG. 4A, a range S indicates the range corresponding to the photo-receiving surface of the photo-sensor 15. 21P indicates the image of the target 21 and 22P indicate the images of the targets 22. At this stage, the coordinates of the target images 22P and the coordinates of the target image 21P detected on the photo-receiving surface (range S) (or virtual central coordinates calculated by the respective coordinates of a plurality of the target images 22P in the vicinity of the target image 21P) are obtained and stored in the memory 41.

Figure 4B:
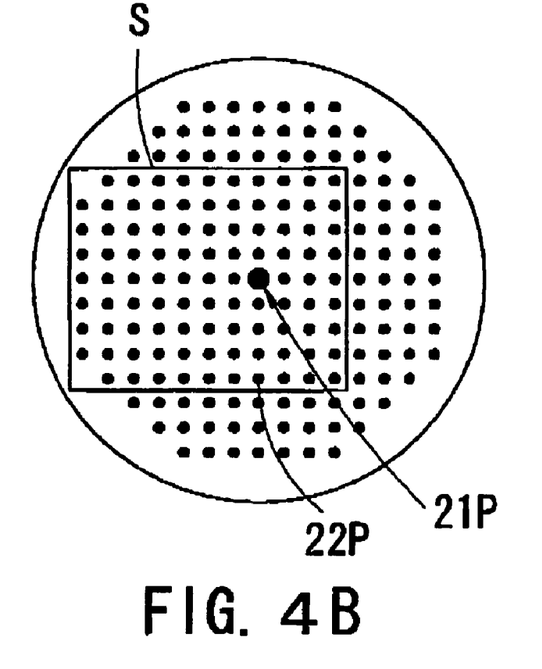

Next, an optical member for light bundle deflection such as a prism member is mounted on the nosepiece 4 and placed on the optical axis 1 so that the target images 22P which are outside the range S in FIG. 4A become detectable on the photo-receiving surface (range S), and thereby the respective coordinates of the target image 21P and the target images 22P are obtained. For example, the prism member having the prism power of 10Δ is used so that, as shown in FIG. 4B, the target images 22P to the left periphery become detectable on the photo-receiving surface (range S), and thereby the respective coordinates are obtained. At this time, it is preferable that image intervals in a common part of the target images 22P previously detected and the target images 22P currently detected are compared and a change rate thereof is obtained, in order to correct a magnification change generated by interposing the prism member. Then, based on the change rate, respective coordinates of the target images 22P in a non-common part are converted into coordinates with reference to the target image 21P in the state where the prism member is not placed on the optical axis L1, and stored in the memory 41. Similarly, by changing a base direction of the prism member, all coordinates of the target images 22P which are outside the range S are obtained, and all coordinates of the target images 22P in the state where the prism member is not placed on the optical axis L1 are stored in the memory 41. As there are individual differences between apparatuses in arrangement of the target 20 in the target plate 14, and installation positions of the target plate 14 and the photo-sensor 15, the coordinates of the target images are stored for each apparatus. That is to say, all coordinates of the target images detected when the photo-receiving surface of the photo-sensor 15 (the range S) is assumed to cover the range in which all target images necessary for the measurement are detectable in the reference state are stored in the memory 41.

Incidentally, when obtaining the coordinates of the target images 22P in the peripheral part of the target plate 14, the prism member may be of any prism power and the base direction of the prism member is not necessarily made strictly lateral/vertical, so far as the target images 22P in the peripheral part are detected by the photo-sensor 15 by utilizing the change rate of the image intervals in the central part of the target plate 14. Further, for the optical member for light bundle deflection used at the time of assembly and adjustment, a single power lens having positive spherical power may be used instead of the prism member, and in such a case, all coordinates of the target images 22P may be obtained at a time.

Subsequently, every time the power application is made, the calculation and control part 40 takes it as a trigger and obtains the respective coordinates of the target images 21P and 22P detected by the photo-sensor 15 to obtain the coordinates of the target images with the "0D reference" in the reference state. At this time, for the respective coordinates of the target images 22P which are not detected by the photo-sensor 15, the common parts of the coordinates of the target images which have been stored at the time of adjustment and the coordinates of the target images currently obtained are compared, so that the coordinates of all target images including the respective coordinates of the target images 22P not detected are obtained.

For example, the respective coordinates of the target image 21P and the target images 22P of 3×3 in the vicinity thereof (the number of the target images 22P may be further increased) detected at the time of power application and the respective coordinates of the corresponding target images 21P and 22P stored in the memory 41 are compared. If there is a displacement of the target plate 14 or the photo-sensor 15 due to a time-course change and the like, both coordinates cannot be compared as they are. Therefore, firstly, the coordinates of all target images stored in the memory 41 are moved so that both coordinates of the target image 21P coincide. Next, two target images 22P interposing the target image 21P are selected, and the coordinates of all target images stored are rotated so that a direction of a line connecting the target images 22P currently detected and a direction of a line connecting the corresponding stored target images 22P coincide. Then, for a plurality of target images 22P in the vicinity of the target image 21P, averages of respective image intervals in a lateral direction and a vertical direction are calculated to obtain the rate with respect to the respective image intervals of the corresponding stored target images 22P. Then, based on the rate, the respective coordinates of the target images 22P stored are magnified or reduced relative to the target image 21P. The coordinates of all target images thus obtained are reset as the coordinates of the target images not detected by the photo-sensor 15, so that the coordinates of the target images with the "0D reference" are obtained. In other words, the coordinates of the target images with the "0D reference" when the photo-receiving surface of the photo-sensor 15 is assumed to be sufficiently wide (large) are obtained. Those coordinates of the target images with the "0D reference" are rewrote and stored in the memory 41 every time the power is applied.

Besides, information on the coordinates of the target images stored in the memory 41 at the time of assembly and adjustment is preferably information on the coordinates of all target images including the target image 21P. However, in the case of saving storage capacity of the memory 41, it may be partial information necessary for correcting the coordinates of the target images with the "0D reference" such as the respective coordinates of the target images not detected by the photo-sensor 15 in the reference state, the respective coordinates of the target images necessary for rotation correction, the coordinates of the target image 21P, and the averages of the lateral image intervals and the vertical image intervals in the vicinity of the center.

Further, the coordinates of the target image which cannot be rightly detected due to dusts and the like at the time of the power application can be substituted by the information on the coordinates stored in the memory 41. Furthermore, the apparatus is favorably so configured that the image intervals of the target images detected at the time of the power application and the image intervals of the target images stored in the memory 41 are compared, and if the change in the image intervals exceeds an allowable value, judgment is made that there is an error in the measurement optical system such as the target plate 14 and a statement thereof is displayed on the display 2. Also when the lens LE is mounted on the nosepiece 4 at the time of the power application, an error message may be displayed based on this judgment.

Hereinafter, measurement of the progressive lens will be described referring to FIGS. 5A to 5F. Besides, the optical characteristics are obtained from the average of the change in the coordinates of the target images of the group of the target images of 3×3, and the measurement position is made the center position of the group of the target images.

Figure 5A:
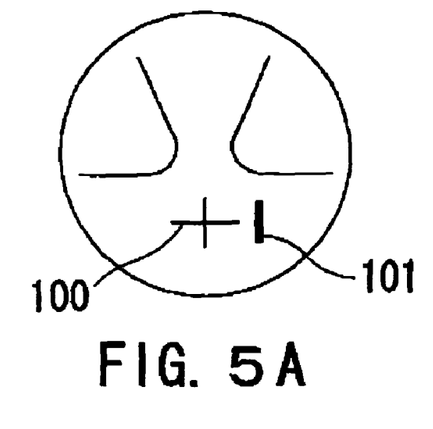
FIGS. 5A to 5F are views illustrating alignment screens at the time of measurement of a progressive lens.
Figure 5B:
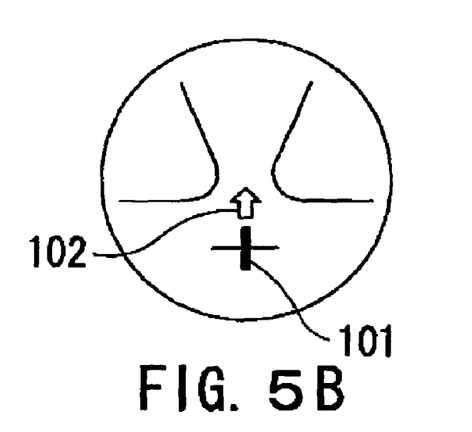
Figure 5C:
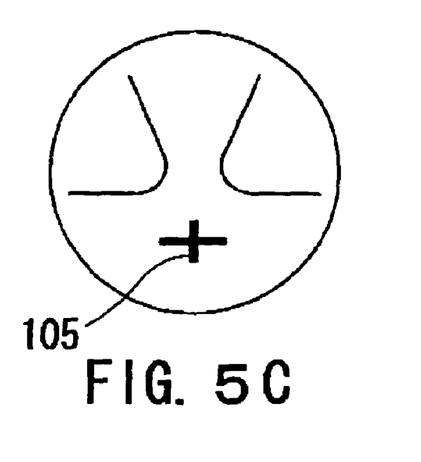

After the apparatus (lens meter) is placed in a progressive lens measurement mode at the press of the switch 3, when the vicinity of the far viewing section of the progressive lens LE is firstly mounted on the nosepiece 4, an alignment screen having a circle imitating the progressive lens is displayed on the display 2, and a central guide mark 100 and a target mark 101 for alignment of the far viewing section appear therein (see FIG. 5A). The alignment for the measurement of the far viewing section is made while observing the display 2. In a case where the lens in frames is measured, as shown in FIG. 1, the lower ends of the right/left lens frames (or right/left lenses) are brought into contact with a contact surface 6a of the frame table 6 (the right/left and the upper/lower, and the lateral and vertical of the frames or the lenses refer to the right/left and the upper/lower, and the lateral and vertical in a state of wearing the spectacles).

In the progressive lens, in a case where it has no cylindrical power, the far viewing section is found as a region where equivalent spherical powers are approximately the same in at least three measurement positions in the upper/lower direction on a vertical axis on which the prism power in the lateral direction of the lens becomes approximately 0. Therefore, the lateral prism power of the lens LE is obtained from the coordinates of the target image 21P or the coordinates of the target images 22P in the vicinity thereof, and the equivalent spherical powers of the group of the target images having the target image 21P as the center and respective groups of the target images positioned in an upper side and a lower side thereof by one target are obtained respectively.

When the lateral prism power is approximately 0, it is judged that the current measurement position in the right/left direction is in the far viewing section (i.e., the far viewing section falls within the measurement area). In addition, when the equivalent spherical power of the group of the target images positioned in the upper side of the target image 21P is larger than the equivalent spherical power of the group of the target images positioned in the lower side of the target image 21P, it is judged that the current measurement position in the upper/lower direction is in a progressive section (i.e., the progressive section falls within the measurement area). In this case, an arrow mark 102 is displayed as an instruction for moving the lens LE upward (i.e., for pressing the lens LE toward the back of the apparatus) (see FIG. 5B). When the equivalent spherical powers at the respective measurement positions in the upper/lower direction are approximately the same, it is judged that the current measurement position in the upper/lower direction is in the far viewing section (i.e., the far viewing section falls within the measurement area). When both measurement positions in the right/left and upper/lower directions are in the far viewing section, the target mark 101 is changed into a large cross mark 105 (see FIG. 5C) to inform that the alignment of the far viewing section is completed. In addition, a measurement value of the far viewing section is stored in the memory 42.

In a case where the lens LE has the cylindrical power, the lateral prism power at the far viewing section does not become approximately 0; therefore, the cylindrical power by the respective groups of the target images in the right/left direction is obtained, and when the cylindrical power becomes the smallest, it is judged that the current measurement position in the right/left direction is in the far viewing section (i.e., the far viewing section falls within the measurement area).

In a case where the mark is provided for recording the far viewing section, alignment is performed so that the measurement position, where the lateral prism power becomes approximately 0 or the cylindrical power becomes the smallest, comes to the center of the opening 4a. When it is aimed at obtaining approximate refractive power of the far viewing section, the alignment need not be strictly performed. In other words, for the alignment in the right/left direction, it is essential only that the lateral prism power becomes approximately 0 or the cylindrical power becomes the smallest at the measurement position by not only the group of the target images in the vicinity of the target image 21P but the other groups. Also, for the alignment in the upper/lower direction, it is essential only that the equivalent spherical powers of at least three measurement positions in a measurable range in the upper/lower direction become approximately the same. In such a case, the power of the position, at which the prism power becomes approximately 0 or the cylindrical power becomes the smallest, and the equivalent spherical powers become approximately the same, is regarded as the measurement value of the far viewing section.

When the measurement value of the far viewing section is stored in the memory 42, the apparatus is shifted to measurement of the near viewing section. On the alignment screen, an arrow mark 121 is displayed as an instruction for moving the lens LE to its lower side (i.e., for pulling the lens LE toward the front of the apparatus) (see FIG. 5D). When it is judged that the current measurement position comes out of the far viewing section by the movement of the lens LE and is in the progressive section, a target mark 120 is displayed. The target mark 120 moves in correspondence with the movement of the lens LE. The target mark 120 is moved while converting a change in the prism power or a change in the add power in the vertical direction into a travel amount. The calculation and control part 40 performs the measurement successively.

Figure 5D:
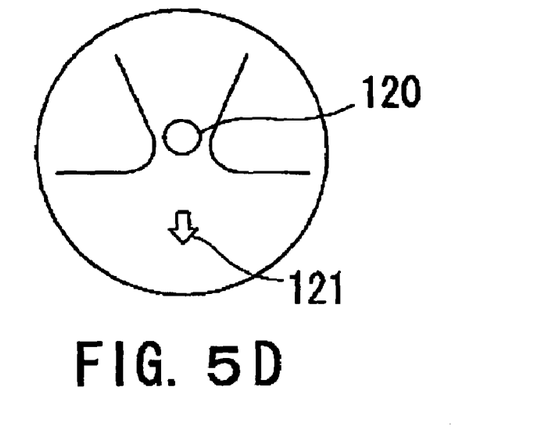
Figure 5E:
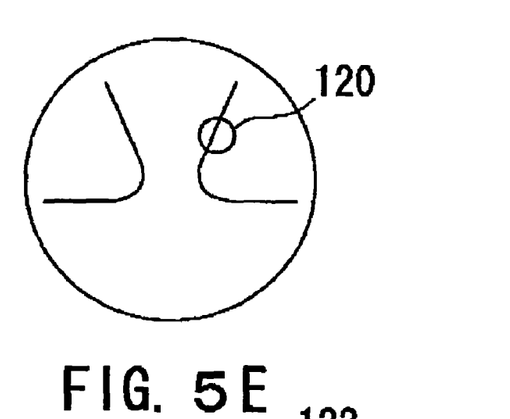
Figure 5F:
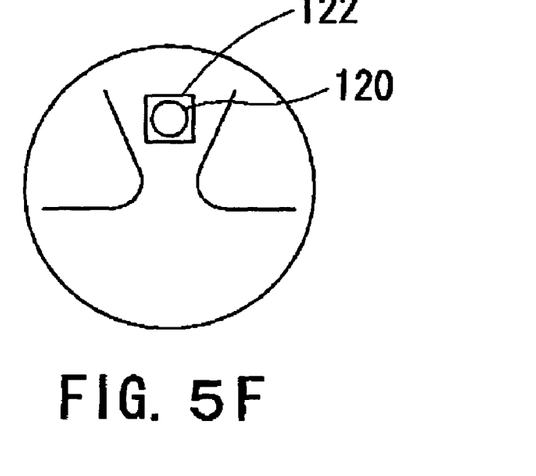

The equivalent spherical powers of the group of the target images having the target image 21P as the center and respective groups of the target images positioned in the upper side and the lower side thereof are obtained respectively, and when the differences between them are large, it is judged that the current measurement position in the upper/lower direction is still in the progressive section (i.e., the progressive section falls within the measurement area). When the equivalent spherical powers of at least three measurement positions in the upper/lower direction are approximately the same, or a peak of the equivalent spherical powers is in the group of the target images having the target image 21P as the center, it is judged that the current measurement position in the upper/lower direction is in the near viewing section (i.e., the near viewing section falls within the measurement area).

Further, as to the right/left direction, an absolute value of a difference between the cylindrical power of the far viewing section previously measured and cylindrical power currently measured is taken as an amount of optical distortion, and the amounts of optical distortion in the group of the target images having the target image 21P as the center and respective groups of the target images on the right and left sides of the target image 21P are calculated, and then, when the amount of optical distortion in the group of the target images having the target image 21P as the center becomes the smallest, it is judged that also the current measurement position in the right/left direction is in the near viewing section (i.e., the near viewing section is within the measurement area). If the smallest amount of optical distortion is found on the right side, the target mark 120 is displayed in a position displaced rightward from the center (see FIG. 5E) to inform that the lens LE should be moved rightward.

When both measurement positions in the upper/lower and right/left directions are in the near viewing section, a sign mark 122 is displayed around the target mark 120 (see FIG. 5F) to inform that the alignment of the near viewing section is completed. At this time, a value obtained by deducting the equivalent spherical power of the far viewing section previously obtained from the equivalent spherical power by the group of the target images having the target image 21P as the center is determined as the add power and displayed on the display 2. In addition, a measurement value of the near viewing section is stored in the memory 42.

Incidentally, in a case where it is aimed at obtaining the approximate refractive power to know the add power (it is usually the case), it may be regarded as favorable if the equivalent spherical powers in the upper/lower direction are approximately the same and a position where the amount of optical distortion is approximately 0 falls within the measurement area. At this time, the add power is displayed based on refractive power of the position satisfying those conditions. Further, in the present apparatus, as the distribution on the optical characteristics at a number of measurement positions within the opening 4a are obtained, the measurement may be performed by directly moving the lens LE to the vicinity of the near viewing section after the completion of the measurement of the far viewing section. That is to say, when the differences in the equivalent spherical powers in the upper/lower direction are large, the lens LE is moved downward so as to move in a direction in which the amount of optical distortion in the right/left direction is small. If the amount of optical distortion in the center part is the smallest, it is judged that the measurement position is in the center part of the progressive section. The displays of the target mark 120, the arrow mark 121, and the like are controlled according to the judgment. Also in a case where the lens LE is moved along the progressive section, it may be accommodated by the judgment and the movement operation according to the above method of judging the position of the near viewing section.

The foregoing description of the preferred embodiments of the invention has been presented for purposes of illustration and description. It is not intended to be exhaustive or to limit the invention to the precise form disclosed, and modifications and variations are possible in the light of the above teachings or may be acquired from practice of the invention. The embodiments chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A lens meter for measuring optical characteristics of a lens, the lens meter comprising:

a lens rest, having an opening, on which the lens is mounted;

a measurement optical system having a measurement optical axis which passes through the opening, a light source which projects a measurement light bundle along the measurement optical axis, a plurality of measurement targets arranged on the measurement optical axis, and a photo-sensor which photo-receives the measurement light bundle passed through the opening and the measurement targets;

a calculation part which calculates the optical characteristics of the lens based on a change in coordinates of images of the measurement targets in a measurement state where the lens is mounted on the rest and placed on the measurement optical axis with respect to coordinates of images of the measurement targets in a reference state where the lens is not mounted on the rest and not placed on the measurement optical axis; and a memory which stores information including the coordinates of the images of the measurement targets, wherein the calculation part makes the memory to store coordinates of images of the measurement targets not detected by the photo-sensor in the reference state which are obtained at the time of assembly and adjustment of the lens meter, and based on coordinates of images of the measurement targets detected by the photo-sensor in the reference state after power application to the lens meter and before measurement of the lens and the coordinates of the images of the measurement targets stored in the memory, obtains coordinates of images of the measurement targets not detected by the photo-sensor in the reference state after the power application to the lens meter and before the measurement of the lens, and the calculation part calculates the optical characteristics of the lens based on a change in coordinates of images of the measurement targets detected by the photo-sensor in the measurement state with respect to the coordinates of the images of the measurement targets detected by the photo-sensor in the reference state before the measurement of the lens and the obtained coordinates of the images of the measurement targets not detected by the photo-sensor in the reference state before the measurement of the lens.

2. The lens meter according to claim 1, wherein the images of the measurement targets not detected by the photo-sensor in the reference state include images of the measurement targets detected by the photo-sensor in the measurement state because prism power is generated.

3. The lens meter according to claim 1, wherein the calculation part makes the memory to store the coordinates obtained by mounting an optical member for light bundle deflection on the rest and placing the optical member on the measurement optical axis at the time of assembly and adjustment so that the images of the measurement targets not detected by the photo-sensor in the reference state become detected by the photo-sensor.

4. The lens meter according to claim 1, wherein the calculation part takes the power application to the lens meter as a trigger and obtains the coordinates of the images of the measurement targets not detected by the photo-sensor in the reference state before the measurement of the lens, based on the coordinates of the images of the measurement targets detected by the photo-sensor in the reference state before the measurement of the lens and the coordinates of the images of the measurement targets stored in the memory.

5. The lens meter according to claim 1, wherein the measurement targets include a reference target being a reference for specifying a correspondence between the respective measurement targets, and the calculation part obtains the coordinates of the images of the measurement targets not detected by the photo-sensor in the reference state before the measurement of the lens by means of coinciding coordinates of an image of the reference target detected by the photo-sensor in the reference state before the measurement of the lens with coordinates of an image of the reference target stored in the memory.

\* \* \* \* \*